United States Patent
Haziza

(10) Patent No.: US 9,973,260 B2
(45) Date of Patent: *May 15, 2018

(54) GLOBAL COMMUNICATION NETWORK

(71) Applicant: Google Inc., Mountain View, CA (US)

(72) Inventor: Dedi David Haziza, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/433,052

(22) Filed: Feb. 15, 2017

(65) Prior Publication Data

US 2017/0163334 A1  Jun. 8, 2017

Related U.S. Application Data

(63) Continuation of application No. 14/804,630, filed on Jul. 21, 2015, now Pat. No. 9,608,714.

(51) Int. Cl.
| | |
|---|---|
| *H04B 7/185* | (2006.01) |
| *H04W 76/00* | (2018.01) |
| *H04L 7/04* | (2006.01) |
| *H04W 76/02* | (2009.01) |
| *H04B 1/707* | (2011.01) |

(Continued)

(52) U.S. Cl.
CPC ............. *H04B 7/185* (2013.01); *H04B 1/707* (2013.01); *H04B 7/04* (2013.01); *H04B 7/155* (2013.01); *H04B 7/18504* (2013.01); *H04L 7/043* (2013.01); *H04W 72/0453* (2013.01); *H04W 76/02* (2013.01)

(58) Field of Classification Search
CPC ..... H04J 11/0023; H04B 7/0606; H04B 1/69; H04B 7/216; H04B 7/185; H04B 7/18504; H04B 7/00; H04B 1/7097; H04L 7/043; H04L 27/2278

See application file for complete search history.

(56) References Cited

U.S. PATENT DOCUMENTS

| | | |
|---|---|---|
| 6,023,605 A | 2/2000 | Sasaki et al. |
| 7,173,977 B2 | 2/2007 | Chen et al. |

(Continued)

OTHER PUBLICATIONS

International Search Report and Written Opinion for the related PCT Application No. PCT/US2016/033883 dated Sep. 1, 2016.

*Primary Examiner* — Benjamin H Elliott, IV
(74) *Attorney, Agent, or Firm* — Honigman Miller Schwartz and Cohn LLP

(57) ABSTRACT

A method for modifying a communication signal for transmission from a source to a destination includes identifying, by data processing hardware, a target platform for communication with a communication device. The method includes establishing a communication connection between the target platform and the communication device and identifying an available communication channel for communicating data between the target platform and the communication device. The method also includes modifying a communication signal by multiplying the communication signal with a pseudo random noise spreading code. The method also includes causing transmission of the modified communication signal from the communication device to the target platform through the available communication channel. The modified communication signal is transmitted below a thermal noise of the available communication channel.

20 Claims, 9 Drawing Sheets

(51) Int. Cl.
    *H04B 7/155*     (2006.01)
    *H04B 7/04*     (2017.01)
    *H04W 72/04*     (2009.01)

(56) References Cited

U.S. PATENT DOCUMENTS

| | | |
|---|---|---|
| 7,184,473 B2 | 2/2007 | Chen et al. |
| 7,184,489 B2 | 2/2007 | Wang et al. |
| 7,209,524 B2 | 4/2007 | Chen |
| 7,230,480 B2 | 6/2007 | Chen et al. |
| 7,423,987 B2 | 9/2008 | Anderson et al. |
| 7,469,019 B2 | 12/2008 | Wang et al. |
| 7,471,735 B2 | 12/2008 | Chen |
| 7,483,495 B2 | 1/2009 | Chen |
| 7,483,505 B2 | 1/2009 | Wang et al. |
| 7,502,429 B2 | 3/2009 | Chen |
| 7,502,430 B2 | 3/2009 | Chen |
| 7,512,189 B2 | 3/2009 | Chen et al. |
| 7,583,728 B2 | 9/2009 | Chen et al. |
| 7,639,759 B2 | 12/2009 | Chen |
| 7,706,466 B2 | 4/2010 | Chen et al. |
| 7,920,643 B2 | 4/2011 | Chen |
| 8,005,035 B2 | 8/2011 | Chen |
| 8,130,818 B2 | 3/2012 | Chen |
| 8,208,526 B2 | 6/2012 | Chen et al. |
| 8,259,641 B2 | 9/2012 | Anderson et al. |
| 8,804,605 B2 | 8/2014 | Anderson et al. |
| 9,608,714 B2 * | 3/2017 | Haziza .................. H04B 1/707 |
| 2002/0126042 A1 | 9/2002 | Chang et al. |
| 2003/0002566 A1 | 1/2003 | McDonough et al. |
| 2005/0002447 A1 | 1/2005 | Kohli et al. |
| 2010/0020742 A1 | 1/2010 | Goodzeit et al. |
| 2012/0182954 A1 | 7/2012 | Cordeiro et al. |
| 2012/0219038 A1 | 8/2012 | Beeler et al. |
| 2013/0114643 A1 | 5/2013 | Shope et al. |
| 2017/0026108 A1 * | 1/2017 | Haziza .................. H04B 1/707 |
| 2017/0163334 A1 * | 6/2017 | Haziza .................. H04B 7/185 |

* cited by examiner

GLOBAL COMMUNICATION NETWORK

CROSS REFERENCE TO RELATED APPLICATIONS

This U.S. patent application is a continuation of, and claims priority under 35 U.S.C. § 120 from, U.S. patent application Ser. No. 14/804,630, filed on Jul. 21, 2015, which is hereby incorporated by reference in its entirety.

TECHNICAL FIELD

This disclosure relates to a global communication network.

BACKGROUND

A communication network is a large distributed system for receiving information (signal) and transmitting the information to a destination. Over the past few decades the demand for communication access has dramatically increased. Although conventional wire and fiber landlines, cellular networks, and geostationary satellite systems have continuously been increasing to accommodate the growth in demand, the existing communication infrastructure is still not large enough to accommodate the increase in demand. In addition, some areas of the world are not connected to a communication network and therefore cannot be part of the global community where everything is connected to the internet.

Satellites are used to provide communication services to areas where wired cables cannot reach. Satellites may be geostationary or non-geostationary. Geostationary satellites remain permanently in the same area of the sky as viewed from a specific location on earth, because the satellite is orbiting the equator with an orbital period of exactly one day. Non-geostationary satellites typically operate in low- or mid-earth orbit, and do not remain stationary relative to a fixed point on earth; the orbital path of a satellite can be described in part by the plane intersecting the center of the earth and containing the orbit. In addition, the communication devices significantly increase the cost of building, launching and operating each satellite; they also greatly complicate the design and development of the satellite communication system and associated antennas and mechanisms to allow each satellite to acquire and track other satellites whose relative position is changing. Each antenna has a mechanical or electronic steering mechanism, which adds weight, cost, vibration, and complexity to the satellite, and increases risk of failure. Requirements for such tracking mechanisms are much more challenging for inter-satellite links designed to communicate with satellites in different planes than for links, which only communicate with nearby satellites in the same plane, since there is much less variation in relative position. Similar considerations and added cost apply to high-altitude communication balloon systems with inter-balloon links.

SUMMARY

One aspect of the disclosure provides a method for modifying a communication signal for transmission from a source to a destination. The method includes identifying, by data processing hardware, a target platform for communication with a communication device, establishing a communication connection between the target platform and the communication device, and identifying an available communication channel for communicating data between the target platform and the communication device. The target platform and the communication device may each be an aerial platform (e.g., drone), a terrestrial platform (e.g., car, truck, train, etc.), or an aquatic platform (e.g., boat). The method also includes modifying a communication signal by multiplying the communication signal with a pseudo random noise spreading code and causing transmission of the modified communication signal from the communication device to the target platform through the available communication channel. The modified communication signal is transmitted below a thermal noise of the available communication channel.

Implementations of the disclosure may include one or more of the following optional features. In some implementations, the method includes, before modifying the communication signal, generating, by the data processing hardware, the communication signal. The pseudo random noise spreading code may spread the communication signal by a factor of 128. In some examples, the modified communication signal is transmitted through the available communication channel in a Ku band. Other bands are possible as well.

In some implementations, identifying the target platform includes tracking, by the data processing hardware, global positions of high altitude platforms and determining, by the data processing hardware, a collection of high altitude platforms and available communication channels for transmitting the communication signal at a communication time of the transmission of the modified communication signal from the communication device. Identifying the target platform also includes selecting, by the data processing hardware, the target platform from the collection of high altitude platforms.

In some examples, identifying the target platform includes querying a data source stored in memory hardware in communication with the data processing. The method may also include querying of the data source for determining a high altitude platform for communication with the communication device and available communication channels for transmitting the communication signal at a communication time of the transmission of the modified communication signal from the communication device.

The communication device may include a phased array antenna. In some examples, establishing the communication connection between the target platform and the communication device includes steering one or more array elements of the phased array antenna to move a corresponding communication beam. In some examples, a ground station or a source high altitude platform includes the data processing device.

Another aspect of the disclosure provides a communication system. The communication system includes a modem and a phased array antenna system. The modem is configured to receive a communication and modify the communication signal by multiplying the communication signal with a pseudo random noise spreading code. The phased array antenna system is in communication with the modem. The phased array antenna system includes a phased array antenna system and data processing hardware. The data processing hardware is configured to perform operations. These operations include identifying a target platform for communication with the phased array antenna and establishing a communication connection between the target platform and the phased array antenna. The operations also include identifying an available communication channel for communicating data between the target platform and the phased array antenna. The operations further include transmitting the modified communication signal from the phased array antenna to the target platform through the available communication channel. The modified communication signal is transmitted below a thermal noise of the available communication channel. The target platform and the communication device may each be an aerial platform (e.g., drone), a terrestrial platform (e.g., car, truck, train, etc.), or an aquatic platform (e.g., boat).

The operations may further include, before modifying the communication signal, generating the communication signal. In some examples, the operations include, before modifying the communication signal, receiving, at the data processing hardware, the communication signal. The pseudo random noise spreading code may spread the communication signal by a factor of 128. Other spreading modes include, but are not limited to, spreading modes for lowering signal-to-noise ratio (SNR) to DVB-S2X (an extension of DVB-S2 satellite digital broadcasting standard) and RCS2 (for Higher Layers for Satellite (HLS) communications).

In some implementations, the modified communication signal is transmitted through the available communication channel in a Ku band. Identifying the target platform includes tracking global positions of high altitude platforms and determining a collection of high altitude platforms and available communication channels for transmitting the communication signal at a communication time of the transmission of the modified communication signal from the phased array antenna. In addition, identifying the target platform may include selecting the target platform from the collection of high altitude platforms.

In some examples, identifying the target platform includes querying a data source stored in memory hardware in communication with the data processing hardware for a high altitude platform for communication with the phased array antenna and available communication channels for transmitting the communication signal at a communication time of the transmission of the modified communication signal from the phased array antenna. The phased array antenna may include antennas disposed on a micro strip and a phase shifter connected to at least one of the antennas.

Establishing the communication connection between the target platform and the phased array antenna includes steering one or more array elements of the phased array antenna to move a corresponding communication beam. In some examples, the phased array antenna system is disposed on a ground station or a source high altitude platform.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A communication system may include satellites and high altitude platforms (HAPs). A ground station may transmit a communication to the satellite, which in turn transmits it to the HAP. The HAP may send or transmit the received communication to one or more user terminals. The reverse may also occur, where the user terminal transmits a communication to the HAP, the HAP transmits the communication to the satellite, and the satellite relays the communication to the ground station. Each satellite may include one or more transponders for relaying the communication from the ground station to the HAP(s) and vice versa. A transponder has a limited number of bandwidth or channels that may be used for transmitting one or more communications. Satellite communications may include television broadcast, telephone, radio, internet, data, and military. Therefore, to transmit a fairly smaller communication, e.g., having a significantly smaller data rate than the transponder provides (e.g., 10 kb/second), a modem at the ground station or the HAP, may spread the smaller signal using direct-sequence spread spectrum (DSSS) before transmitting the communication through a phased array antenna (e.g., under noise threshold). Moreover, the phased array antenna system may select a channel of the transponder that is available for use, i.e., not being used, to transmit the modified spread signal. However, if the transponder does not have any available channels, the transmitter may utilize a channel that is already transmitting a signal since the modified spread signal does not interfere with any signals being transmitted through the transponder channels.

Figure 1A:
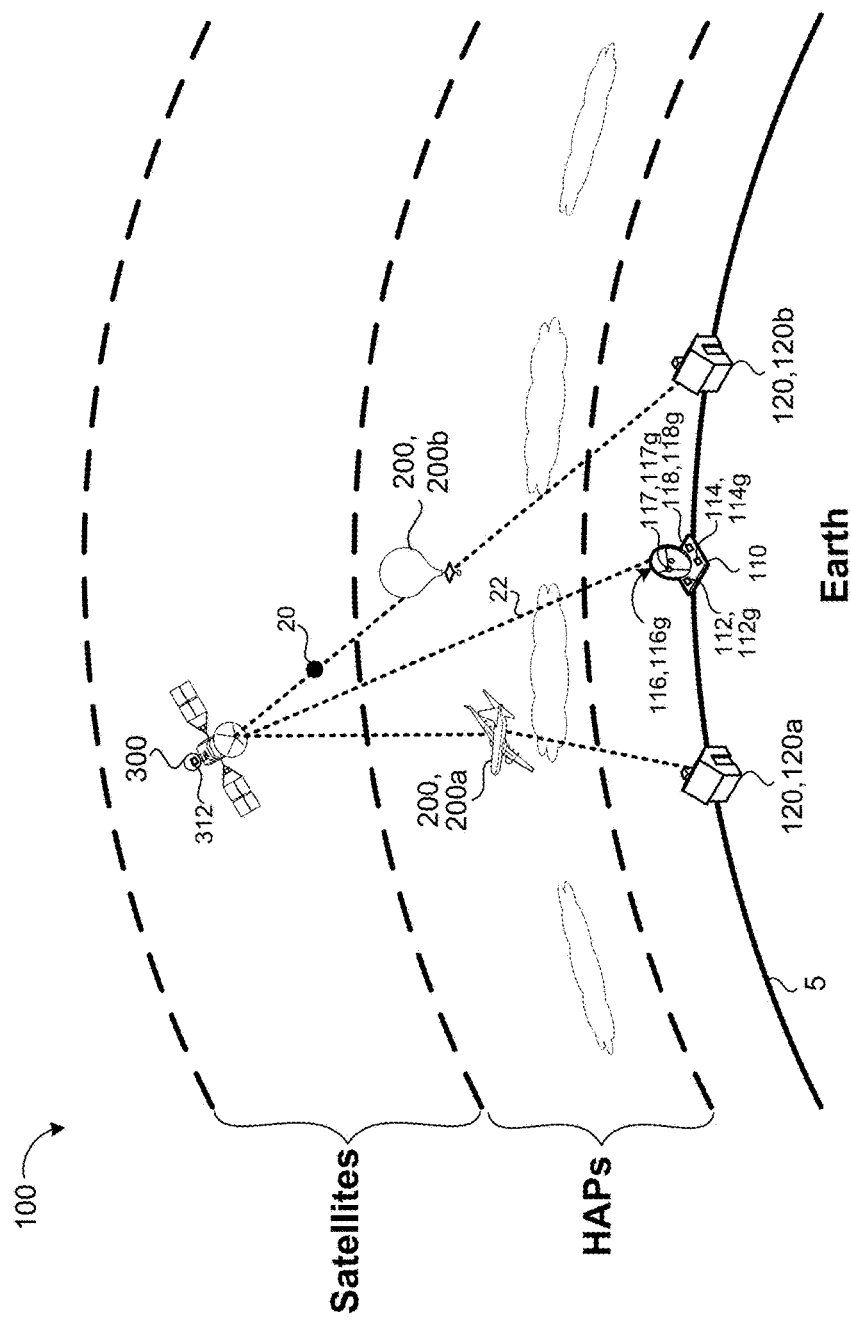
FIG. 1A is a schematic view of an exemplary communication system.
Figure 1B:
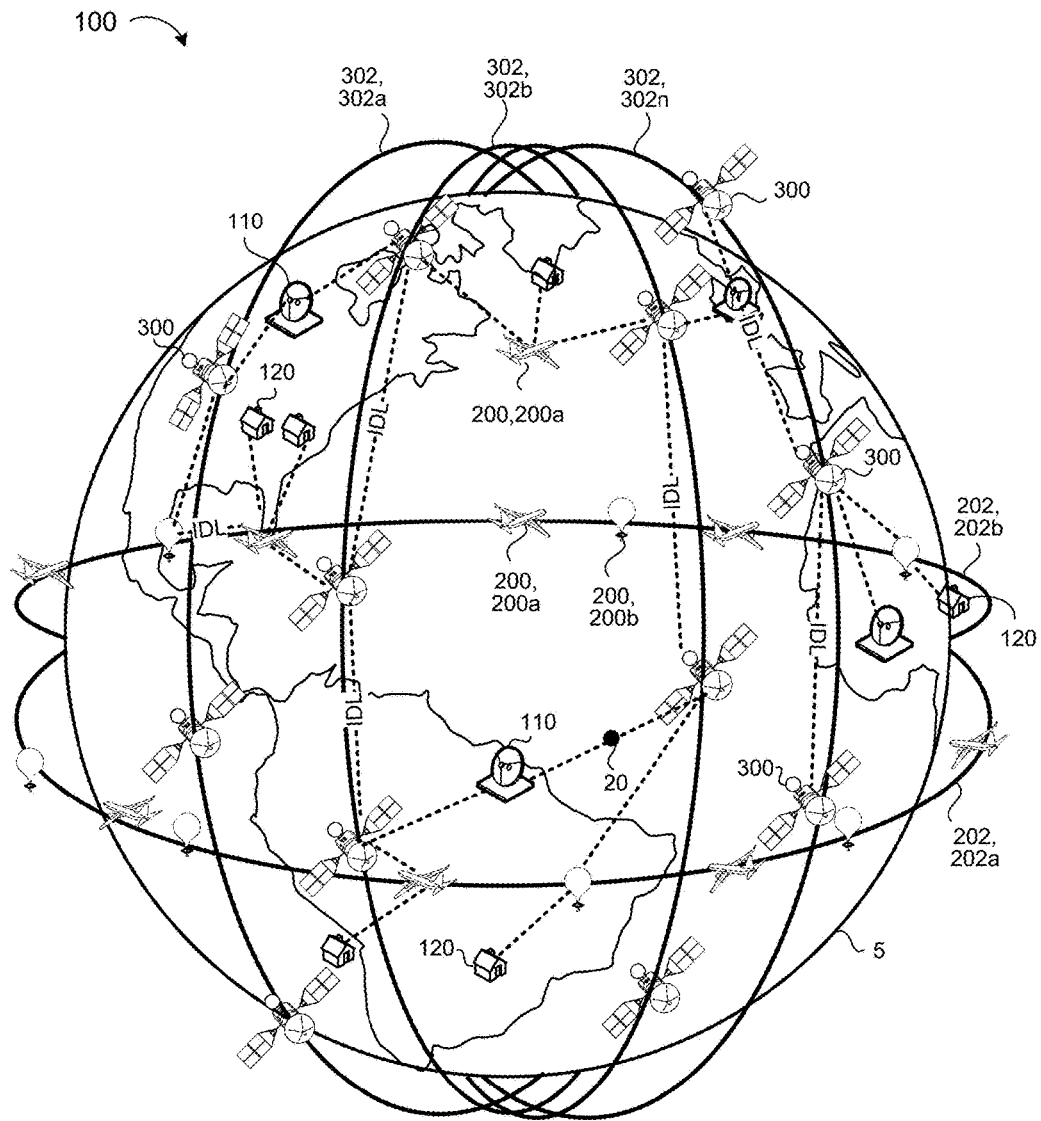
FIG. 1B is a schematic view of an exemplary global-scale communication system with satellites and high altitude platforms (HAPs), where the satellites form a polar constellation.
Figure 1C:
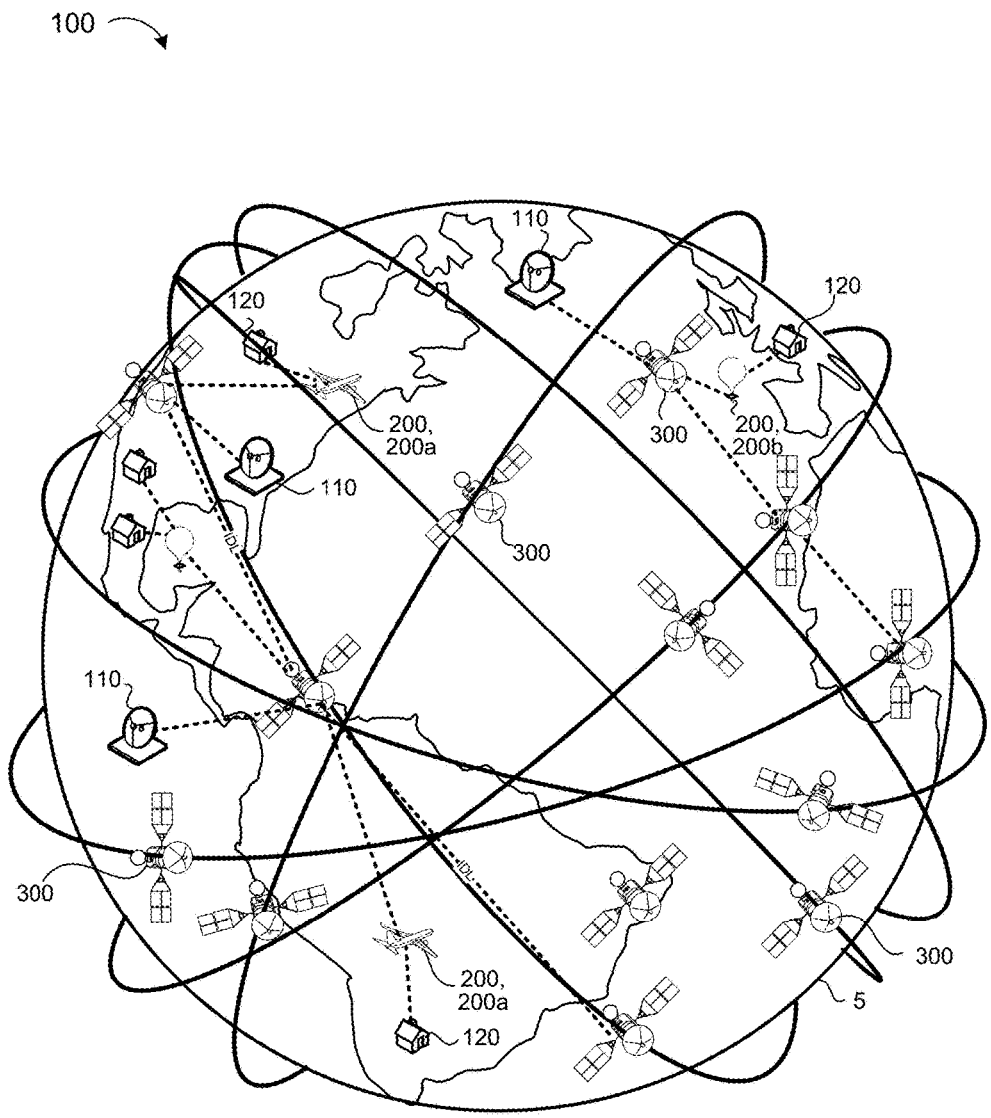
FIG. 1C is a schematic view of an exemplary group of satellites of FIG. 1A forming a Walker constellation.

Referring to FIGS. 1A-1C, in some implementations, a global-scale communication network 100 includes one or more ground stations 110, one or more terminals 120, one or more high altitude platforms (HAPs) 200, and one or more satellites 300. Each ground station 110 may communicate with the one or more satellites 300, each satellite 300 may communicate with the one or more HAPs 200, and each HAP 200 may communicate with the one or more terminals 120, 120a, 120b. The ground stations 110 may be connected to one or more service providers (not shown) and the terminals 120 may be a user terminal (e.g., mobile devices, residential WiFi devices, home networks, etc.). The ground station 110 may be a stationary platform, an aerial platform (e.g., drone), a terrestrial platform (e.g., car, truck, train, etc.), or an aquatic platform (e.g., boat).

In some implementations, a HAP 200 is an aerial communication device that operates at high altitudes (e.g., 17-22 km). The HAP 200 may be released into the earth's atmosphere, e.g., by an air craft, or flown to the desired height. Moreover, the HAP 200 may operate as a quasi-stationary aircraft. In some examples, the HAP 200 is an aircraft 200a, such as an unmanned aerial vehicle (UAV); while in other examples, the HAP 200 is a communication balloon 200b. The satellite 300 may be in Low Earth Orbit (LEO), Medium Earth Orbit (MEO), or High Earth Orbit (HEO), including Geosynchronous Earth Orbit (GEO).

The HAPs 200 may move about the earth 5 along a path, trajectory, or orbit 202 (also referred to as a plane, since their orbit or trajectory may approximately form a geometric plane). Moreover, several HAPs 200 may operate within the same or different orbits 202. For example, some HAPs 200 may move approximately along a latitude of the earth 5 (or in a trajectory determined in part by prevailing winds) in a first orbit 202a, while other HAPs 200 may move along a different latitude or trajectory in a second orbit 202b. The HAPs 200 may be grouped amongst several different orbits 202 about the earth 5 and/or they may move along other paths 202 (e.g., individual paths). Similarly, the satellites 300 may move along different orbits 302, 302a-n. Multiple satellites 300 working in concert form a satellite constellation. The satellites 300 within the satellite constellation may operate in a coordinated fashion to overlap in ground coverage. In the example shown in FIG. 1B, the satellites 300 operate in a polar constellation by having the satellites 300 orbit the poles of the earth 5; whereas, in the example shown in FIG. 1C, the satellites 300 operate in a Walker constellation, which covers areas below certain latitudes and provides a larger number of satellites 300 simultaneously in view of a ground station 110 on the ground (leading to higher availability, fewer dropped connections). In some examples, satellites 300 in GEO orbit within a plane of the Earth's equator have a radius of approximately 42,164 km or 26,199 miles measured from the center of the earth 5.

When building a global communication system 100, one of the difficulties to be considered is creating links 22 that allows a ground station 110 in the U.S. to communicate with a user terminal 120 in Japan, for example. If the global communication system 100 includes HAPs 200, then the ground station 110 in the U.S. may not have a direct line-of-sight with the HAP 200 that transmits the communication 20 to the user terminal 120 in Japan. One way to achieve a link 22 from a ground station 110 that does not have a direct line-of-sight (e.g., a link 22) with a HAP 200 is to use a satellite 300 that is in the line-of-sight of both the ground station 110 and the HAP 200. Thus, the ground station 110 can transmit the communication 20 to the destination terminal 120, e.g., Japan using the satellite 300. The use of the satellite 300 requires buying or leasing bandwidth of a transponder 312 from a satellite service provider.

In some examples, the transponder 312 of a satellite gathers signals 20 from transmitters, e.g., one or more ground stations 110 or one or more user terminals 120, over a set of uplink frequencies and re-transmits the signals 20 on a different set of downlink frequencies to receivers, e.g., one or more ground stations 110 or one or more user terminals 120 on earth 5, without changing the content of the signal(s) 20. In some examples, a transponder 312 is defined by a set of satellite equipment that defines one unit of satellite capacity, usually 24 MHz or 36 MHz. Therefore, each transponder 312 of a satellite provides limited bandwidth that is divided among communication service providers (e.g., TV broadcasters, or Virtual Network Operators (VSATs), or government organizations). Communication service providers may lease one or more transponders 312 of one or more satellites 300 from the satellite service provider to broadcast their communication 20. Leasing a transponder 312 may be extremely costly due to the limited number of transponders 312 available on each satellite 300. When building a global communication network 100, the most costly consideration can be the bandwidth (i.e., channels).

Due to that, the service may be extremely expensive, since there may be a limited number of channels or bandwidth that may be used. Therefore, it may be desirable to build a communication network 100 that allows for a communication service provider to transmit and receive a communication 20 using the satellites 300, while maintaining a low cost of leasing bandwidth from the satellite service providers. Direct Sequence Spread Spectrum (DSSS) may be implemented as part of the global communication network 100 (e.g., modem 112) to reduce cost, power density, and secure communication, while transmitting a signal 20 globally or locally from the ground station 110 to user terminals 120 by way of the satellite 300 and/or HAPs 200. The use of DSSS allows the communication service provider to transmit a signal 20 below noise level without interfering with other signal transmissions, i.e., the transmitted signals 20 may co-exist with other signals being transmitted above the noise level. This allows for a global communication network 100, which increases the bandwidth by sending signals or communication 20 within the noise levels, which is normally not used for communications, resulting in low operational cost of the global communication network 100.

In some implementations, the ground station 110 is a terrestrial radio station configured to provide extra planetary telecommunication with the one or more satellites 300. In other implementations, the ground station 110 is moving across land, air, or water. A ground station 110 in communication with a satellite 300 establishes a link 22. In some examples, if a ground station 110 is trying to establish a link 22 with a satellite 300 that is moving with respect to the ground station 110, or the ground station 110 is moving with respect to the satellite 300, or both are moving with respect to one another, then the ground station 110 includes a phased array antenna system 116 (e.g., tracking antenna) to maintain the link 22 with the satellite 300. In other examples, when the ground station 110 is in communication with a satellite 300 having a fixed position with respect to the ground station 110, then the ground station 110 includes a phase array antenna 117 that always points to the same direction, i.e., the direction of the satellite 300 to maintain a communication link 22.

The ground station 110 may be stationary or mobile (e.g., on a boat or a moving object). In some examples, the ground station 110 includes a data processing device, such as a modem 112, 112g that processes a received communication 20 before sending it to the satellite 300, or processes a received communication 20 from the satellite 300.

Direct-sequence spread spectrum (DSSS) is a spread spectrum modulation technique used in telecommunications. Spread spectrum systems are configured to transmit a modified signal S3 (FIGS. 4A and 4B) that contains the communication 20 using a bandwidth that is in excess of the bandwidth that the message signal S1 actually needs, which results in a wideband signal that appears as a noise signal allowing greater resistance to intentional and unintentional interference with the transmitted modified signal S3. Therefore, a phased array antenna system 116 (at the ground station 110 or HAP 200) transmits a modified signal S3, 20 below the thermal noise after receiving a data signal S1, where the modified signal S3 is transmitted below the thermal noise level of the bandwidth. When sending a modified signal S3, the modem 112, 112g multiples a data signal S1 with a unique series S2 producing a noise signal, i.e., the modified signal S3. When receiving the modified signal S3, the modem 112, 112g at the receiving end regenerates the data signal S1 by multiplying the modified signal S3 with the same unique series S2.

DSSS phase-shifts a signal wave pseudo randomly with a continuous string of pseudo-noise code symbols called chips; each chip has a much shorter duration than an information bit. In other words, each information bit of the data signal S1 is modulated by a sequence S2 of much faster chips. Thus, the chip rate is much higher than the information signal bit rate. Moreover, DSSS uses a signal structure where the sequence of chips produced by the transmitter (i.e., ground station 110 or HAP 200) is known by the receiving end (i.e., ground station 110 or HAP 200). This allows for the receiving end to use the same pseudo-noise sequence S2 to counteract the effect of the pseudo-noise sequence S2 on the received modified signal S3 in order to reconstruct the information signal S2.

In some implementations, the modem 112, 112g of the ground station 110 is a DSSS modem. The modem 112, 112g (modulator-demodulator) is a device that modulates signals to encode digital information and demodulates signals to decode the transmitted information. The modem 112, 112g produces a signal that is easily transmitted and decoded to reproduce the original data. The modem 112, 112g receives a communication signal S1 from a communication service provider and generates a modified signal S3 or a communication 20 to transmit. The modem 112, 112g selects a narrow band channel and spreads the communication signal S1 by multiplying it with a pseudo random noise spreading code S2. For example, the DSSS modem 112, 112g receives the communication signal S1 and converts it to a modified signal S3 by multiplying the data signal S1 with a PN sequence S2 (pseudo-random noise spreading code), which is independent of the data signal S1; thus producing the modified signal S3 for transmission. In some examples, the PN sequence spreads the information signal S1 by a factor of 128, but there is no limit on the amount of spreading. The pseudo-random noise spreading code S2 can be implemented as forward error correction (FEC) coding, repetition coding, frequency hopping, and/or adaptive spreading. Other techniques are possible as well. Other spreading modes include, but are not limited to, spreading modes for lowering signal-to-noise ratio (SNR) to DVB-S2X (an extension of DVB-S2 satellite digital broadcasting standard) and RCS2 (for Higher Layers for Satellite (HLS) communications).

In order to retrieve the original data signal S1, a receiver modem (e.g., on a HAP 200) de-spreads the transmitted modified signal S3, i.e., multiplies the transmitted modified signal S3 with the same PN sequence S2. If a different PN sequence is used, then the modem 112, 112g at the receiving end fails to de-spread or retrieve the original data signal S1. Similarly, when the DSSS modem 112, 112g receives a modified signal S3, the DSSS modem 112, 112g multiplies the received modified signal S3 with the PN sequence S2 used at the transmitting modem. In other words, when the DSSS modem 112, 112g receives an information signal S1, it spreads the information signal S1 resulting in a modified signal S3; and when the DSSS modem 112, 112g receives a modified signal S3, the DSSS modem 112, 112g de-spreads the modified signal S3 resulting in an information signal S1. When the modem 112, 112g spreads the information signal S1, its energy is spread over a wide set of frequencies/channels, where each frequency/channel has a portion of that energy. The DSSS modem 112, 112g spreads a bandwidth $BW_{S1}$ of the information signal S1 over a much larger bandwidth $BW_{SS}$, where $BW_{SS} \gg BW_{S1}$. The SS signal spectrum is white noise-like. The amplitude and the power of the SS-signal is the same as the information signal S1.

Zero-mean White Gaussian Noise (WGN) has the same power spectral density for all frequencies. 'White' is used because white light contains equal amounts of all frequencies within the visible band of electromagnetic radiation. Pseudo-Random Noise (PN) code sequence acts like a noise-like, yet deterministic carrier used to spread the energy of a signal over a bandwidth (e.g., the bandwidth of the transponder 312). Selection of a good PN code S2 is important since the length and type of the code sets the bounds of the capability of the modem 112, 112g. In some examples, the PN code S2 is a Pseudo-Noise or Pseudo-Random sequence of 1's and 0's. However, the PN code is not a real random sequence because it is periodic. Random signals cannot be predicted. Therefore, the transmitted modified signal S3 is secure, has low power because it is spread over the channels of the transponder, and capable of being transmitted to any global terminal since the communication system is using existing equipment 110, 200, 300.

As previously discussed, the satellites 300 may be geosynchronous satellite, meaning that the satellite 300 returns to the same location over the earth 5 every day, or geostationary satellite, which means that the satellite 300 appears to be at a fixed location in the sky from an observer on earth 5. When the ground station 110 is in communication with a geosynchronous satellite, the phased array antenna system 116, 116g of the ground station 110 may include a tracking device 114, 114g for tracking the moving satellites 300 orbiting the earth 5 that are within the ground station's field of view. The tracking device 114, 114g may be part of or separate from the phased array antenna system 116, 116g of the ground station 110, where the phased array antenna system 116, 116g is designed to communicate with one or more satellites 300.

In some implementations, the phased array antenna system 116, 116g includes a wideband active phased array antenna 117, 117g and data processing hardware 118, 118g. Phased array antenna systems 116, 116g provide fast beam steering, which is the ability to generate simultaneous beams and dynamically adjust the characteristics of the beam patterns. The phased array antenna 117, 117g includes a set of individual antennas that transmit and/or receives radio waves. The individual antennas are connected together in such a way that the individual current of each antenna has specific amplitude and phase relationship, allowing the individual antennas to act as a single antenna. The relative phases of the respective signals feeding the antennas of the phased array antenna are set in a manner that an effective radiation pattern of the array is reinforced in a desired direction and suppressed in undesired directions. The phase relationships between the individual antennas may be fixed (e.g., a tower array antenna), or adjustable (e.g., beam steering antenna). In some examples, the phased array antenna 117, 117g includes antennas disposed on a micro strip and a phase shifter connected to at least one of the antennas. Moreover, the wideband active phased array antenna 117, 117g allows the transmission of the message bandwidth, which significantly exceeds the coherence bandwidth of the channel, i.e., allowing the global communication network 100 to transmit below the thermal noise level. In some examples, active phased array antennas 117, 117g incorporate transmit amplification with phase shift in each antenna element or group of elements.

The data processing hardware 118, 118g of the phased array antenna system 116, 116g may include the tracking device 114, 114g or may be in communication with the tracking device 114, 114g. The data processing hardware 118, 118g of the phased array antenna system 116, 116g is configured to identify a target HAP 200 or satellite 300 for communication with the phased array antenna 117, 117g (e.g., having a line-of-sight with the phased array antenna 117, 117g) and establish a communication connection or link 22 between the target HAP 200 or satellite 300 and the ground station 110. Moreover, the data processing hardware 118, 118g of the phased array antenna system 116, 116g is configured to identify an available communication channel for communicating data between the target HAP 200 or satellite 300 and the ground station 110. Moreover, the data processing hardware 118, 118g of the phased array antenna system 116, 116g is configured to transmit a modified communication signal (received from the modem 112, 112g) from the phased array antenna 117, 117g to the target HAP 200 or satellite 300 through the available communication channel or link 22. The modified communication signal S3 is transmitted below a thermal noise of the available communication channel. The data processing hardware 118, 118g of the phased array antenna system 116, 116g identifies the target HAP 200 or satellite 300 by tracking global positions of HAPs 200 or satellites 300 and determining a collection of HAPs 200 or satellites 300 for communication with the phased array antenna 117, 117g and available communication channels for transmitting the modified signal S3 at a communication time of the transmission of the modified signal S3 from the phased array antenna 117, 117g, and selects the target HAP 200 or satellite 300 from the collection of HAPs 200 or satellites 300. Alternatively, identifying the target HAP 200 or satellite 300 may include querying a data source (not shown) stored in memory hardware in communication with data processing hardware 118, 118g in communication with the data processing hardware of the target HAP 200 or satellite 300 that, for example, has or does not have a line-of-sight with the phased array antenna 117, 117g and available communication channels for transmitting the modified signal S3 at a communication time of the transmission of the modifies communication S3 from the phased array antenna S3.

Figure 2B:
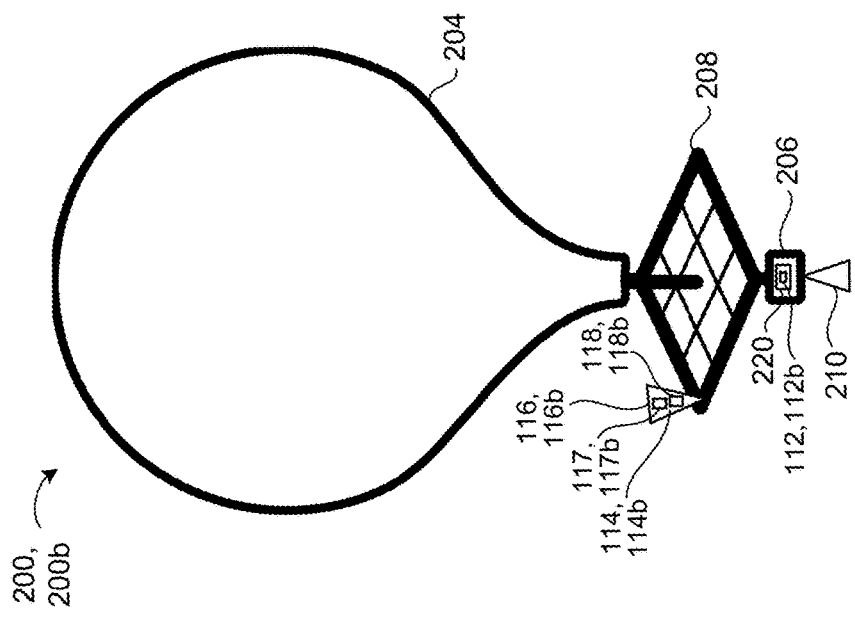
FIGS. 2A and 2B are perspective views of example HAPs.
Figure 2A:
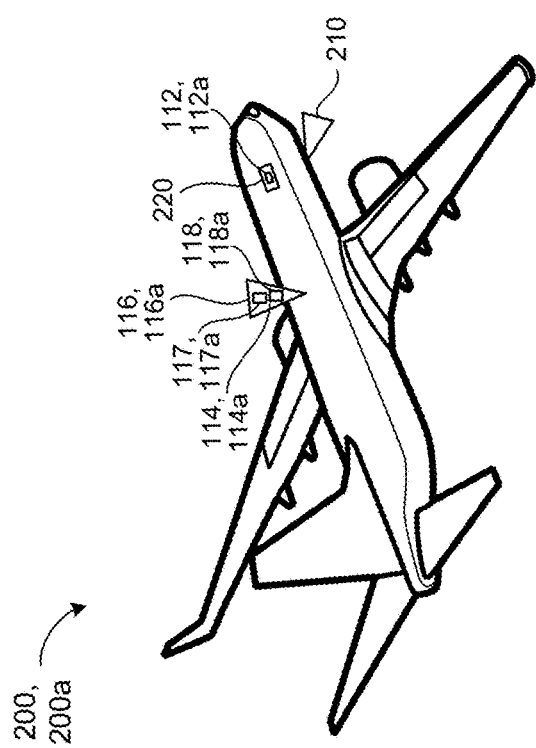

Referring to FIGS. 2A and 2B, in some implementations, the HAP 200, 200a, 200b includes an antenna 210, 210a, 210b that receives/transmits a communication 20 from a user terminal 120. The HAP 200, 200a, 200b also includes the phased array antenna system 116, 116a, 116b and the modem 112, 112a, 112b, similar to the phased array antenna system 116g and the modem 112g discussed with respect to the ground station 110. The phased array antenna system 116, 116a, 116b allows for communication between the HAP 200 and the satellite 300. Thus the array antenna system 116a, 116b includes the tracking device 114a, 114b, the phased array antenna 117,117a, 117b, and the data processing hardware 118, 118a, 118b same as the data processing hardware 118g of the ground station. In some examples, and as previously discussed, the satellite 300 and/or the HAP 200 is moving; therefore, the phased array antenna system 116, 116a, 116b of the HAP 200 needs to track a position of one or more satellites 300 to maintain a communication link 22 between the HAP 200 and the satellite 300. The satellite 300 receives a communication from one of the phased array antenna system 116, 116a, 116b, 116g of the ground station 110 or the HAP 200 and sends it back to the other one of the phased array antenna system 116, 116a, 116b, 116g of the ground station 110 or the HAP 200. The HAP 200 may include a data processing device 220 that processes the received communication 20 (i.e., the modified signal S3 or the signal received from the communication provider or user terminals) and determines a path of the communication 20 to arrive at the destination terminal 120 (e.g., user terminal).

The processing device 220 may include the modem 112, 112a, 220b. In some implementations, user terminals 120 on the ground have specialized antennas that send/receive communication signals to/from the HAPs 200. The HAP 200 receiving the communication 20 from the user terminal 120 sends the communication 20 to one or more satellites 300. The HAP 200 also includes an antenna 210 for receiving and sending the communications 20 to the user terminals 120.

FIG. 2A illustrates an example aircraft 200a, such as an unmanned aerial vehicle (UAV). A UAV, also known as a drone, is an aircraft without a human pilot onboard. There are two types of UAVs, autonomous aircrafts and remotely piloted aircraft. As the name suggests, autonomous aircrafts are designed to autonomously fly, while remotely piloted aircrafts are in communication with a pilot who pilots the aircraft. In some examples, the aircraft 200a may be remotely piloted and autonomous at the same time. The UAV usually includes wings to maintain stability, a GPS system to guide it through its autonomous piloting, and a power source (e.g., internal combustion engine or electric battery) to maintain long hours of flight. In some examples, the UAV is designed to maximize efficiency and reduce drag during flight. Other UAV designs may be used as well.

FIG. 2B illustrates an example communication balloon 200b that includes a balloon 204 (e.g., sized about 49 feet in width and 39 feet in height and filled with helium or hydrogen), an equipment box 206, and solar panels 208. The equipment box 206 includes a data processing device 220 that executes algorithms to determine where the high-altitude balloon 200a needs to go, then each high-altitude balloon 200b moves into a layer of wind blowing in a direction that may take it where it should be going. The equipment box 206 also includes batteries to store power and a transceiver (e.g., antennas 210) to communicate with other devices (e.g., other HAPs 200, satellites 300, ground stations 110, such as user terminals 110b, internet antennas on the ground, etc.). The solar panels 208 may power the equipment box 206.

Communication balloons 200b are typically released in to the earth's stratosphere to attain an altitude between 11 to 23 miles and provide connectivity for a ground area of 25 miles in diameter at speeds comparable to terrestrial wireless data services (such as, 3G or 4G). The communication balloons 200b float in the stratosphere, at an altitude twice as high as airplanes and the weather (e.g., 20 km above the earth's surface). The high-altitude balloons 200a are carried around the earth 5 by winds and can be steered by rising or descending to an altitude with winds moving in the desired direction. Winds in the stratosphere are usually steady and move slowly at about 5 and 20 mph, and each layer of wind varies in direction and magnitude.

Figure 3:
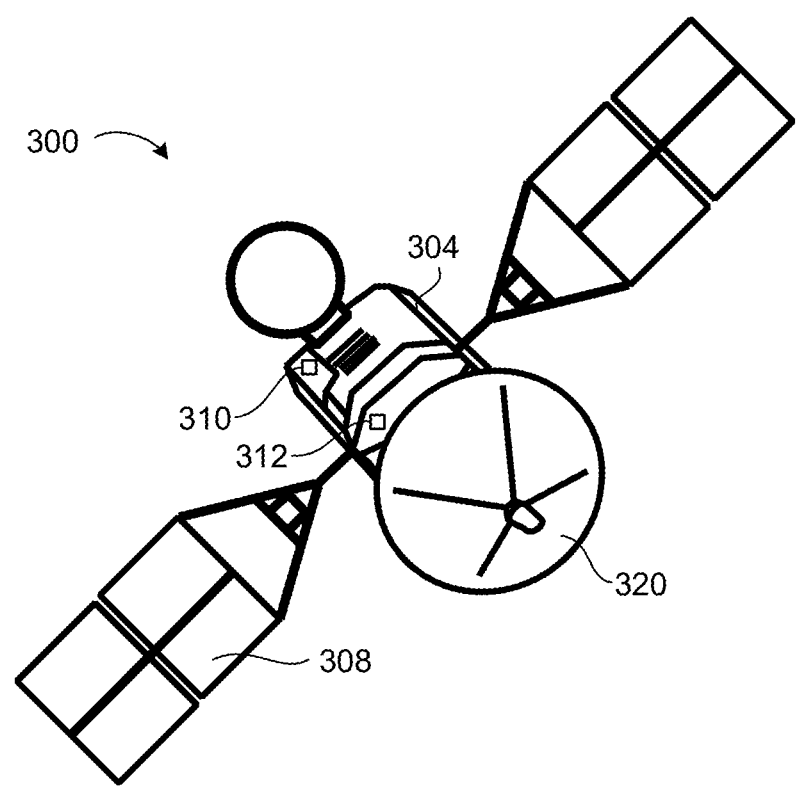
FIG. 3 is a perspective view of an example satellite.

Referring to FIG. 3, a satellite 300 is an object placed into orbit 302 around the earth 5 and may serve different purposes, such as military or civilian observation satellites, communication satellites, navigations satellites, weather satellites, and research satellites. The orbit 302 of the satellite 300 varies depending in part on the purpose of the satellite 200b. Satellite orbits 302 may be classified based on their altitude from the surface of the earth 30 as Low Earth Orbit (LEO), Medium Earth Orbit (MEO), and High Earth Orbit (HEO). LEO is a geocentric orbit (i.e., orbiting around the earth 5) that ranges in altitude from 0 to 1,240 miles. MEO is also a geocentric orbit that ranges in altitude from 1,200 mile to 22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit. Satellites 300 placed in the GEO orbit can "stand still" with respect to a certain location on earth 5. Thus, a person on earth 5 looking at a satellite 300 in the GEO orbit would perceive that the satellite 300 is not moving. Therefore, the satellites 300 in GEO orbit maintain a position with respect to a location on earth 5. Thus, an antenna 116 of a ground station 110 communicating with a satellite 300 in the GEO orbit does not need to keep tracking the satellite 300 as it moves, it only needs to point to a direction of the satellite 300 in its stationary position with respect to the ground stations 110.

In some implementations, a satellite 300 includes a satellite body 304 having a payload that includes a data processing device 310, e.g., similar to the data processing device 220 of the HAPs 200. The data processing device 310 executes algorithms to determine where the satellite 300 is heading. The satellite 300 also includes an antenna 320 for receiving and transmitting a communication 20. The satellite 300 includes solar panels 308 mounted on the satellite body 204 for providing power to the satellite 300. In some examples, the satellite 300 includes rechargeable batteries used when sunlight is not reaching and charging the solar panels 308.

In some examples, the payload of each satellite 300 includes one or more transponder(s) 312. Each transponder 312 receives a communication 20 from a ground station 110, processes, encodes, amplifies and rebroadcasts the signal over a large area of the surface of the earth 5 to one or more terminals 120. Therefore, the transponder 312 is a signal processing unit that uses a signal high-power amplification chain. Each transponder 312 handles a particular frequency range (i.e., bandwidth or channels) centered on a specific frequency. In some examples, each satellite 300 includes at least one transponder 312 (e.g., 60 transponders or more, each transponder 312 capable of transmitting up to 10 digital television signals), each transponder 312 capable of supporting one or more communication channels.

The transponder 312 may be used for broadcasting television channels. In some examples, the communication 20 received at the user terminal 120 from the transponder 312 is encoded so that only paying customers at the user terminals 120 are capable of receiving the communication 20. In some examples, one or more satellite service providers own the transponders 312 and lease bandwidth or channels of a transponder 312 to a communication service provider. The communication service provider wants to transmit/receive a communication 20 at the ground station 110 to/from user terminals 120.

In some examples, the transponder 312 gathers signals 20 from one or more ground stations 110 over a set of uplink frequencies and re-transmits the signals 20 on a different set of downlink frequencies to receivers on earth 5, without changing the content of the signal(s) 20. In some examples, a transponder 312 is defined by a set of satellite equipment that defines one unit of satellite capacity, usually 24 MHz or 36 MHz. Therefore, each transponder 312 of a satellite 300 provides limited bandwidth that is divided among communication service providers (e.g., TV broadcasters, or Virtual Network Operators (VSATs), or government organizations). Communication service providers may lease one or more transponders 312 of one or more satellites 300 from the satellite service provider to broadcast their communication 20. Leasing a transponder 312 may be extremely costly due to the limited number of transponders 312 available on each satellite 300. When building a global communication network, the most costly consideration to be made is the bandwidth (i.e., channels). Due to that, the service may be extremely expensive since there is a limited number of channels or bandwidth that may be used. Therefore, it is desirable to build a communication network 100 that allows for a communication service provider to transmit and receive a communication 20 using the satellites 300, while maintaining low cost of leasing bandwidth from the satellite service providers. Therefore, a direct spectrum modem 112 is used at the ground station 110 and the HAP 200 to reduce cost, power density, and secure communication, while transmitting a signal 20 globally or locally from/ground station 110 to user terminals 120 by way of the satellite 300 and HAPs 200.

In some implementations, the satellite 300 includes tracking, telemetry, command and ranging (TT&R) that provides a connection between the satellite 300 and facilities on the ground, e.g., the ground station 110 or the HAPs. The TT&R ensures that the satellite 300 establishes communication or a link 22 to successfully receive/transmit a communication 20. The TT&R performs several operations, including, but not limited to, monitoring the health and status of the satellite 300 by way of collecting, processing, and transmitting data from the one source (e.g., the ground station 110) to the destination (e.g., HAP 200) or vice versa, passing through the satellite 300. Another operation includes determining the satellite's exact location by way of receiving, processing, and transmitting of communications 20. Yet another operation of the TT&R includes properly controlling the satellite 300 through the receiving, processing, and implementing of commands transmitted from the ground stations 110. In some examples, a ground operator controls the satellite 300; however, such an intervention by the operator is only minimal or in case of an emergency and the satellite 300 is mostly autonomous.

In some examples, the satellite 300 includes batteries to operate the satellite 300 when the solar panels 208 of the satellite 300 are hidden from the sun due to the earth 5, the moon, or any other objects. In some examples, the satellite 300 also includes a reaction control system (RCS) that uses thrusters to adjust the altitude and translation of the satellite 300 making sure that the satellite 300 stays in its orbit 202. The RCS may provide small amounts of thrusts in one or more directions and torque to allow control of the rotation of the satellite 300 (i.e., roll, pitch, and yaw).

Referring back to FIG. 1A, in some implementations, when constructing a global-scale communications network 100 using HAPs and satellites 300, a 'bent pipe' architecture is used. The bent pipe architecture, shown in FIG. 1A, is where the satellite 300 receives a communication 20 from the ground station 110 and sends it to the user terminal 120, in this case through the HAP 200. Another example is where the satellite 300 receives a communication 20 from the terminal 120 through the HAP 200 and sends it to the ground station 110. The satellite 300 receives the communication 20 and sends it to its destination, acting like a bent pipe. In this case, the satellite 300 acts as a repeater and no satellite 300 to satellite 300 communication occurs, i.e., the satellite 300 does not transfer the communication 20 to another satellite 300 before transmitting it to its destination.

Referring back to FIG. 1B, in some implementations, it is sometimes desirable to route traffic over long distances through the global communication network 100 by linking HAPs 200 to satellites 300 and/or one HAP 200 to another. For example, two satellites 300 may communicate via inter-device links and two HAPs 200 may communicate via inter-device links. Inter-device link (IDL) eliminates or reduces the number of HAP 200 or satellite 300 ground station 110 hops, which decreases the latency and increases the overall network capabilities. Inter-device links allow for communication traffic from one HAP 200 or satellite 300 covering a particular region to be seamlessly handed over to another HAP 200 or satellite 300 covering the same region, where a first HAP 200 or satellite 300 is leaving the first area and a second HAP 200 or satellite 300 is entering the area. Such inter-device linking is useful to provide communication services to areas far from the ground stations 110 and the terminals 120 and may also reduce latency and enhance security (fiber optic cables 12 may be intercepted and data going through the cable may be retrieved). Therefore, when using IDL, the first device in the transmission chain (e.g., modulates the communication signal S1, i.e., multiplies it by the sequence S2), and the last device in the transmission chain (e.g., HAP 200 that receives the modified signal S3) de-spreads the modified signal S3 before transmitting the communication data S1 to the user terminals 120.

The use of the IDL model is different than the "bent-pipe" model, in which all signal traffic goes from a source ground station 110 to a satellite 300, and then directly down to a destination, e.g., user terminal 120 or vice versa. The "bent-pipe" model does not include any inter-device communications. Instead, the satellite 300 acts as a repeater. In some examples of "bent-pipe" models, the signal received by the satellite 300 is amplified before it is re-transmitted; however, no signal processing occurs. In other examples of the "bent-pipe" model, part or all of the signal may be processed and decoded to allow for one or more of routing to different beams, error correction, or quality-of-service control; however no inter-device communication occurs.

In some implementations, large-scale communication constellations 100 are described in terms of a number of orbits 202, 302, and the number of HAPs 200 or satellites 300 per orbit 202, 302. HAPs 200 or satellites 300 within the same orbit 202, 302 maintain the same position relative to their intra-orbit HAP 200 or satellite 300 neighbors. However, the position of a HAP 200 or a satellite 300 relative to neighbors in an adjacent orbit 202, 302 may vary over time. For example, in a large-scale satellite constellation with near-polar orbits, satellites 300 within the same orbit 202 (which corresponds roughly to a specific latitude, at a given point in time) maintain a roughly constant position relative to their intra-orbit neighbors (i.e., a forward and a rearward satellite 300), but their position relative to neighbors in an adjacent orbit 302 varies over time. A similar concept applies to the HAPs 200; however, the HAPs 200 move about the earth 5 along a latitudinal plane and maintain roughly a constant position to a neighboring HAP 200.

One of the advantages of using a DSSS modem 112 to spread a communication signal S1 before transmission, is that the ground station 110 or the HAP 200 do not need a large antenna 117, which leads to a reduction in the power consumption by the antenna 117, a reduction of the dimensions of the antenna 117 and weight of the payload of the ground station 110 and the HAP 200, a more simplified mechanical design of the ground station 110 and the HAP 200.

As previously described, a communication service provider may lease channels for transmitting signals via a transponder. The bandwidth available for leasing may be 36 Mhz or 24 Mhz. However, the communication service provider may only need a relatively smaller bandwidth to transmit his/her communication 20, (e.g., 10 kbs). In such a case, leasing 36 Mhz or 24 Mhz may be very expensive since only 10 kbs are needed, thus it is wasteful to lease a transponder 312 that provides 36 Mhz or 24 Mhz to only use a small fraction of the available bandwidth. At any given time, on a satellite system 300, not all of the transponders 312 are being used. For each transponder 312, a fraction of its available channels may be in use at a given time. In addition, such use of the channels of each transponder 312 may vary at any given time. In order to save operational costs, a system that utilizes DSSS modems 112 and transmits below the noise level of the channels being used, and capable of hopping to an unused channel when necessary allows for a signal to be transmitted in the noise range along with other signals without causing interference between the signals.

In such a case, the communication service provider and the satellite service provider may agree that the communication service provider send the noise signal by way of the transponder 312 on the satellite, without leasing an entire bandwidth of the transponder 312 and only leasing the needed bandwidth. This significantly reduces the operational cost of sending a communication 20 that is relatively smaller than the available bandwidth of a transponder 312, without having to lease the entire bandwidth of the transponder 312. Moreover, and to increase the chances of preventing interference, the phased antenna system 116 may determine which channels are available and frequency hop the noise signal to an available channel, by moving the center of the noise signal to any available unused channels, which further minimizes interference.

The algorithms used to determine the path of a communication 20 (e.g., at the data processing device 220) may include a scoring function for assigning a score or weight value to each link (communication between the ground station 110, the HAPs 200, and/or the satellites 300). These scores are considered in the algorithms used. For example, the algorithm may try to minimize the cumulative weight of the path (i.e., sum of the weights of all the links that make up the path). In some implementations, a system data processor considers the physical distance (and, closely related, latency) between the ground station 110, the HAPs 200, and/or the satellites 300, the current link load compared to the capacity of the link between the ground station 110, the HAPs 200, and/or the satellites 300, the health of the ground station 110, the HAPs 200, and/or the satellites 300, or its operational status (active or inactive, where active indicates that the device is operational and healthy and inactive where the device is not operational); the battery of the ground station 110, the HAPs 200, and/or the satellites 300 (e.g., how long will the device have power); and the signal strength at the user terminal (for user terminal-to-satellite link).

Figure 4A:
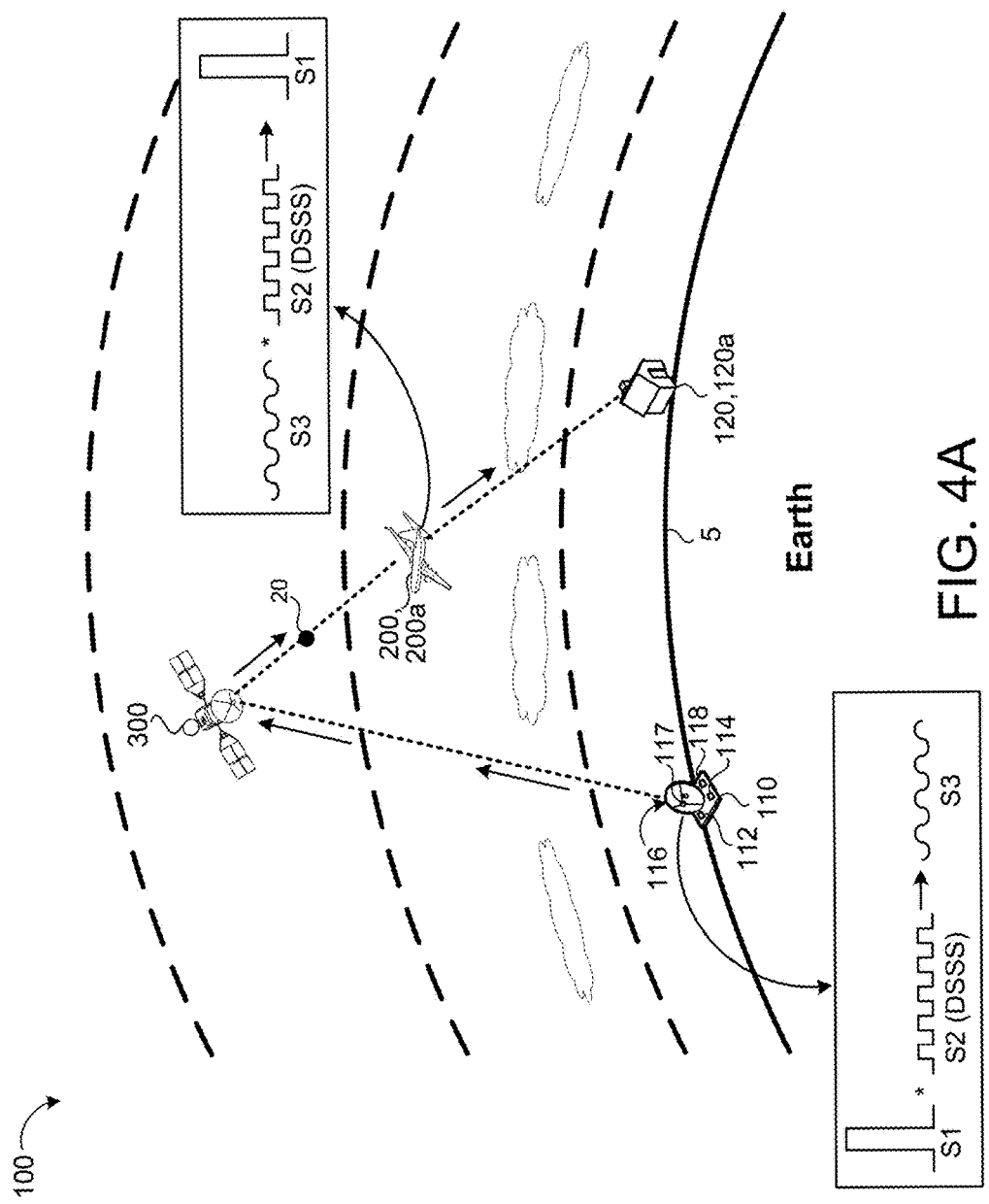
FIGS. 4A and 4B are schematic views of an exemplary path between HAPs for sending a communication between a first user and a second user in a global-scale communication system.
Figure 4B:
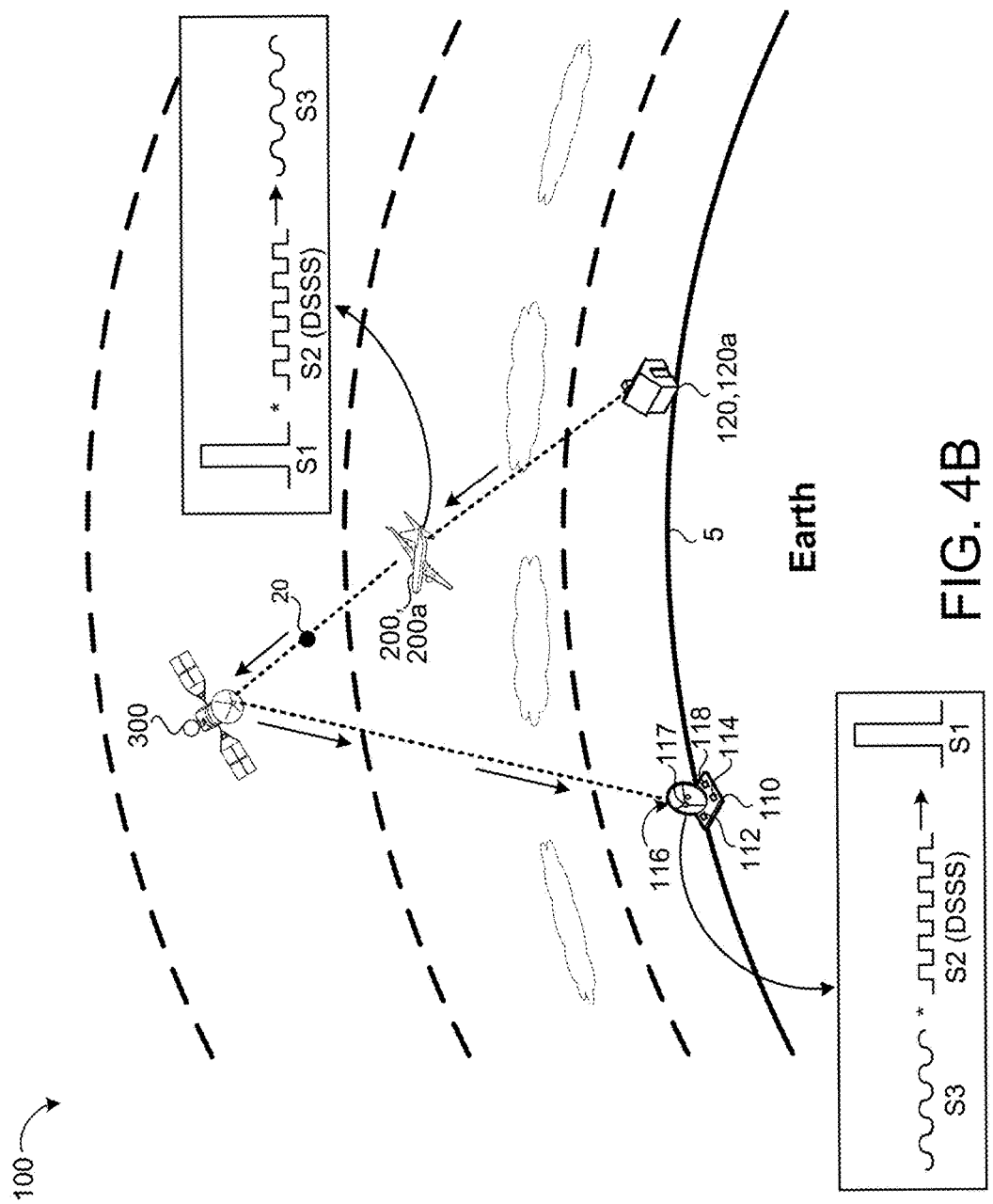
Figure 5:
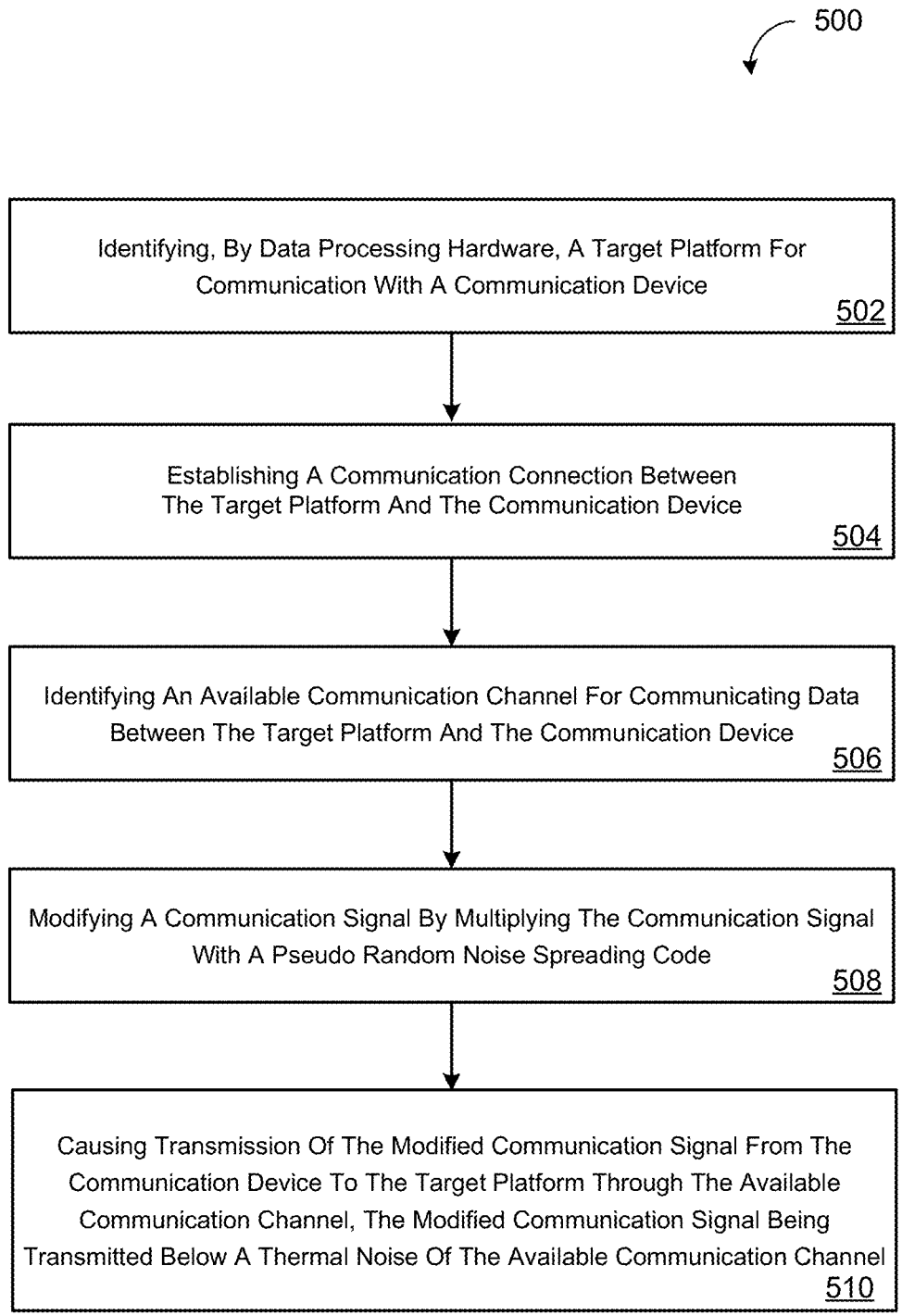
FIG. 5 is a schematic view of an exemplary arrangement of operations for communicating between a source and a destination.

FIGS. 4A-5, illustrate an arrangement of operations for communicating between a source and a destination. FIG. 4A shows a source as the ground station 110 and the destination being the user terminal 120, where the communication 20 travels from the ground station 110 to the satellite 300 to the HAP 200, and finally to the user terminal 120. FIG. 4B shows the same elements of FIG. 4A; however, in FIG. 4B the source of the communication 20 is the user terminal 120, which travels to the HAP 200, then the satellite 300, before reaching the destination ground station 110. In some examples, the communication 20 of FIGS. 4A and 4B occur simultaneously, since both the ground station 110 and the HAP 200 include a modem 112 that applies a pseudo-random code S2, and an antenna system 116 that includes a phased array antenna 117 and data processing hardware 118. In some examples, data processing hardware 118 also refers to the tracking device 114 or the modem 112. The pseudo-random code S2 can be implemented as forward error correction (FEC) coding, repetition coding, frequency hopping, and/or adaptive spreading. Other techniques are possible as well.

FIG. 5 illustrates a method 500 for modifying a communication signal S1 for transmission from a source (e.g., ground station 110 or HAP 200) to a destination (e.g., ground station 110 or HAP 200). At block 502, the method 500 includes identifying, by the data processing hardware 118, a target platform (e.g., the target satellite 300 or the HAP 200) for communication with a communication device (e.g., phased array antenna 117 of the ground station 110 or the HAP 200). In some examples, the target platform has a line-of-sight with the communication device; while in other examples, the target platform does not have a line-of-sight with the communication device. In some examples, the communication network 100 only includes ground stations and HAPs 200, therefore, the HAP 200 may act as a satellite 300, and relay the communication 20 to another destination or another HAP 200. The method 500, at block 504, includes establishing a communication connection between the target satellite 300 (or HAP 200) and the communication device 117 and at block 506, identifying an available communication channel for communicating data (i.e., a modified signal S3) between the target satellite 300 (or HAP 200) and the communication device 117. The method 500 also includes, at block 508, modifying a communication signal S1 by multiplying the communication signal S1 with a pseudo random noise spreading code S2 resulting in a modified signal S3. The method 500 also includes, at block 510, causing transmission of the modified communication signal S3 from the communication device 117 to the target satellite 300 (or HAP 200) through the available communication channel. The modified communication signal S3 may be transmitted below a thermal noise of the available communication channel, in some examples. In other examples, the modified communication signal S3 is transmitted at, near, or above the thermal noise of the available communication channel.

In some implementations, the method 500 further includes, before modifying the communication signal S1, generating, by the modem 112, the communication signal S1 after receiving data from a communication service provider. The pseudo random noise spreading code S2 may spread the communication signal S1 by a factor of 128. In some examples, the modified communication signal S3 is transmitted through the available communication channel in a Ku band. The Ku band is the 12-18 GHz portion of the electromagnetic spectrum in the microwave range of frequencies. The Ku band is primarily used for satellite communication, mostly fixed and broadcast services. Other bands are possible as well.

In some implementations, identifying the target satellite 300 (or HAP 200), at block 502, includes tracking, by the data processing hardware (e.g., a tracking device 114), global positions of satellites 300 (or HAPs 200), and determining, by the data processing hardware (e.g., antenna system 116), a collection of satellites 300 (or HAPs 200) for communication with the phased array antenna 117 and available communication channels for transmitting the communication signal S1 after modifying it to the modified signal S3, at a communication time of the transmission of the modified communication signal S3 from the communication device (i.e., ground station 110 or HAP 200). Identifying the target satellite 300, at block 502, may also include selecting, by the data processing hardware (e.g., the antenna system 116), the target satellite 300 (or HAP 200) from the collection of satellites 300 (or HAPs 200).

In some examples, identifying the target satellite 300 includes querying a data source stored in memory hardware in communication with the data processing hardware, i.e., the antenna system 116 and querying of the data source for determining a high altitude platform 200, 300 for communication with the communication device 110, 200 (e.g., for a high altitude platform 200, 300 that has a line-of-sight with the communication device 110, 200) and available communication channels for transmitting the communication signal, i.e., the modified signal S3, at a communication time of the transmission of the modified communication signal S3 from the communication device 110, 200.

In some examples, establishing the communication connection between the target satellite 300 and the communication device 110, 200 includes steering one or more array elements of the phased array antenna 117 to move a corresponding communication beam. In some examples, a ground station 110 or a source high altitude platform 200 includes the data processing device 114, 118.

Figure 6:
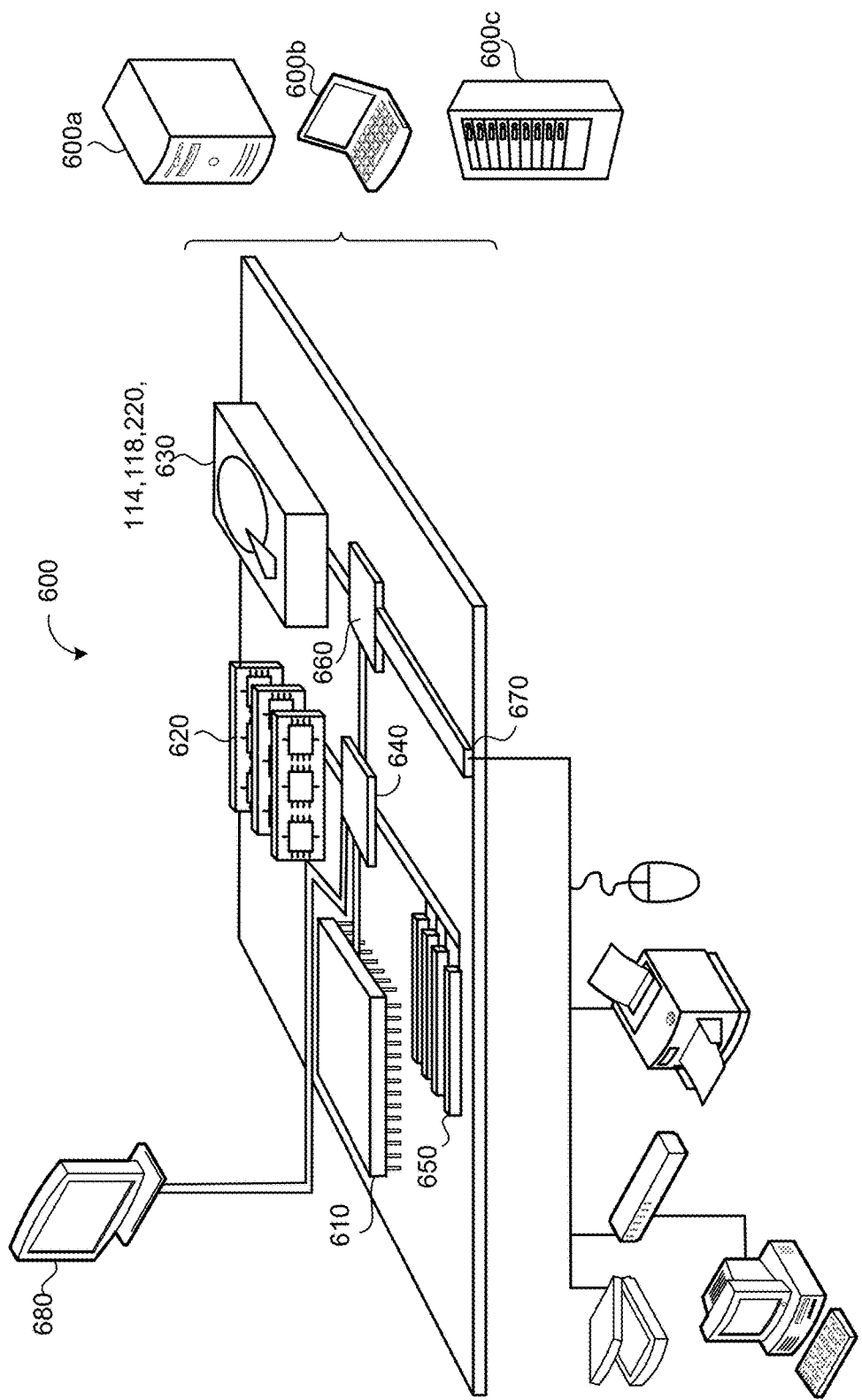
FIG. 6 is a schematic view of an example computing device executing any systems or methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 500, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described here can be realized in digital electronic circuitry, integrated circuitry, specially designed ASICs (application specific integrated circuits), FPGAs (field-programmable gate arrays), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit), or an ASIC specially designed to withstand the high radiation environment of space (known as "radiation hardened", or "rad-hard").

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
    identifying, by data processing hardware, a target platform for communication with a communication device;
    establishing a communication connection between the target platform and the communication device;
    identifying, by the data processing hardware, an available communication channel for communicating data between the target platform and the communication device;
    modifying, by the data processing hardware, a communication signal by multiplying the communication signal with a pseudo-random noise-spreading code, the communication signal being above a thermal noise of the available communication channel before the modifying of the communication signal, and a modified communication signal resulting from the modifying of the communication signal being below the thermal noise of the available communication channel; and
    causing, by the data processing hardware, transmission of the modified communication signal from the communication device to the target platform through the available communication channel, the modified communication signal being transmitted below the thermal noise of the available communication channel.

2. The method of claim 1, further comprising, before modifying the communication signal, generating, by the data processing hardware, the communication signal.

3. The method of claim 1, further comprising, before modifying the communication signal, receiving, at the data processing hardware, the communication signal.

4. The method of claim 1, wherein the pseudo random noise spreading code spreads the communication signal by a factor of 128.

5. The method of claim 1, wherein the modified communication signal is transmitted through the available communication channel in a Ku band.

6. The method of claim 1, wherein identifying the target platform comprises:
    tracking, by the data processing hardware, global positions of high altitude platforms;
    determining, by the data processing hardware, a collection of high altitude platforms and available communication channels for transmitting the communication signal at a communication time of the transmission of the modified communication signal from the communication device; and
    selecting, by the data processing hardware, the target platform from the collection of high altitude platforms.

7. The method of claim 1, wherein identifying the target platform comprises identifying a high altitude platform for communication with the communication device and available communication channels for transmitting the communication signal at a communication time of the transmission of the modified communication signal from the communication device.

8. The method of claim 1, wherein the communication device comprises a phased array antenna.

9. The method of claim 8, wherein establishing the communication connection between the target platform and the communication device comprises steering one or more array elements of the phased array antenna to move a corresponding communication beam.

10. The method of claim 1, wherein a ground station or a source high altitude platform comprises the data processing hardware.

11. A communication system comprising:
a modem configured to:
 receive a communication signal; and
 modify the communication signal by multiplying the communication signal with a pseudo random noise spreading code; and
a phased array antenna system in communication with the modem, the phased array antenna system comprising:
 a phased array antenna; and
 data processing hardware configured to perform operations comprising:
  identifying a target platform for communication with the phased array antenna;
  establishing a communication connection between the target platform and the communication system;
  identifying an available communication channel for communicating data between the target platform and the communication system, the communication signal being above a thermal noise of the available communication channel before the modifying of the communication signal, and a modified communication signal resulting from the modifying of the communication signal being below the thermal noise of the available communication channel; and
  transmitting the modified communication signal from the phased array antenna to the target platform through the available communication channel, the modified communication signal being transmitted below the thermal noise of the available communication channel.

12. The communication system of claim 11, wherein the operations further comprise, before modifying the communication signal, generating the communication signal.

13. The communication system of claim 11, wherein the operations further comprise, before modifying the communication signal, receiving the communication signal.

14. The communication system of claim 11, wherein the pseudo random noise spreading code spreads the communication signal by a factor of 128.

15. The communication system of claim 11, wherein the modified communication signal is transmitted through the available communication channel in a Ku band.

16. The communication system of claim 11, wherein identifying the target platform comprises:
 tracking global positions of high altitude platforms;
 determining a collection of high altitude platforms and available communication channels for transmitting the communication signal at a communication time of the transmission of the modified communication signal from the phased array antenna; and
 selecting the target platform from the collection of high altitude platforms.

17. The communication system of claim 11, wherein identifying the target platform comprises identifying a high altitude platform for communication with the phased array antenna and available communication channels for transmitting the communication signal at a communication time of the transmission of the modified communication signal from the phased array antenna.

18. The communication system of claim 11, wherein the phased array antenna comprises:
 antennas disposed on a micro strip; and
 a phase shifter connected to at least one of the antennas.

19. The communication system of claim 11, wherein establishing the communication connection between the target platform and the phased array antenna comprises steering one or more array elements of the phased array antenna to move a corresponding communication beam.

20. The communication system of claim 11, wherein the phased array antenna system is disposed on a ground station.

* * * * *